United States Patent [19]

Sasatake et al.

[11] Patent Number: 4,895,405
[45] Date of Patent: Jan. 23, 1990

[54] BUMPER MOUNTING STRUCTURE FOR A VEHICLE

[75] Inventors: Nobuhiko Sasatake; Tsuneyuki Wada; Fumihiko Ebihara; Kunimichi Odagaki, all of Saitama, Japan

[73] Assignee: Honda Giken Kogyo Kabushiki Kaisha, Tokyo, Japan

[21] Appl. No.: 238,683

[22] Filed: Aug. 31, 1988

[30] Foreign Application Priority Data

Sep. 1, 1987 [JP] Japan ............... 62-133753[U]

[51] Int. Cl.$^4$ ............................................. B60R 19/02
[52] U.S. Cl. .................................... 293/102; 293/119; 293/154; 293/155
[58] Field of Search ............... 293/102, 119, 140, 117, 293/155, 154, 116, 118

[56] References Cited
U.S. PATENT DOCUMENTS 4,597,603 7/1986 Trabert ........................... 293/117

Primary Examiner—Andres Kashnikow
Assistant Examiner—T. Mark Le
Attorney, Agent, or Firm—Armstrong, Nikaido, Marmelstein, Kubovcik & Murray

[57] ABSTRACT

A bumper mounting structure in which a vertical parting line is defined between a bumper and a part of a vehicle body such as a fender. In order to control the width of the parting line, the mounting structure comprises a first member attached to the bumper, a second member attached to the fender and coupled to the first member for sliding engagement therebetween so as to permit a relative motion along the fore-and-aft direction of the vehicle body, and a screw member threaded to one of the members and abuts the other member for adjusting the relative distance therebetween. By turning this screw member, the width of the vertical parting line can be adjusted to an optimum value and a favorable unified appearance is produced between the bumper and the fender.

6 Claims, 2 Drawing Sheets

BUMPER MOUNTING STRUCTURE FOR A VEHICLE

TECHNICAL FIELD

The present invention relates to a structure for mounting a side portion of a bumper to a vehicle body, and in particular to an improved bumper mounting structure having means for adjusting the position of the bumper in relation with a part of the vehicle body such as a fender.

BACKGROUND OF THE INVENTION

Motor vehicles are generally provided with bumpers in the front and rear for the purpose of reducing the shock to the occupants and the vehicle body when the vehicle collides with an object at low speed. According to some of the recent automotive designs, the bumper and the fender are given with a unified appearance, and considerable efforts are paid to make the boundary between the bumper and the fender as unnoticeable as possible. Typically, the upper part of the bumper is painted in the same color as the other part of the vehicle body, and the bumper is separated from the other part of the vehicle by a horizontal parting line.

In such a case, since the dimensions of the bumper, the fenders and other parts of vehicle bodies cannot be made highly precise, and some dimensional errors are inevitable, it is important to prevent any unattractive appearance due to dimensional errors, particularly in the areas of transition from the bumper to the other parts of the vehicle body, such as the fenders. Generally speaking, the vertical positioning of a bumper is not a major problem because there is some overlapping between the vehicle body and the bumper. However, the lateral spacing between the bumper and the fender is more noticeable to the viewer.

Japanese Utility Model Publication No. 60-193849 discloses a mounting structure for the side portion of a bumper. According to this utility model, a pair of tongue plates 11 project inwardly from the bumper 4 and are passed through the slots 12 provided in the bracket 7 which is fixedly attached to the fender 3. The free end of each of the tongue plates 11 is gripped by a pair of spring loaded clips 17 (each pair being pivotally connected to each other through a pivot pin 20). The surfaces of the tongue plate and the working ends of the clips are provided with irregular surfaces for secure engagement therebetween, and the free ends of the clips abut the opposing surface of the bracket 12, thereby positively defining the spacing between the bumper and the fender. This prior art offers a well defined lateral positioning of the bumper with respect to the fender, but is not adjustable and therefore cannot accommodate any dimensional errors in the relevant parts.

Japanese Utility Model Application No. 60-158952 teaches an adjustable bumper mounting structure. A pair of parallel racks 8 and 9 are attached to the fender and the bumper, and are received in a casing 11. A pinion 10 meshes with both the racks 8 and 9. By turning the pinion 10, the spacing between the bumper and the fender can be adjusted, and the racks and the pinion are fixed at their adjusted positions by the friction imposed upon the racks by the casing.

However, for improved unified appearance of a bumper and a fender, it is advantageous to separate them not only by a horizontal parting line but also by a vertical parting line. In such a case, the width of the vertical parting line is highly noticeable and is desired to be controlled as precisely as possible in spite of the inevitable dimensional errors of the body structure. The above mentioned and other prior art is inadequate to control the width of a vertical parting line between a bumper and a fender in an automotive body structure having a unified appearance.

BRIEF SUMMARY OF THE INVENTION

In view of such shortcomings of the prior art, a primary object of the present invention is to provide an improved bumper mounting structure in which a bumper and a part of a vehicle body such as a fender are given with a unified appearance.

A second object of the present invention is to provide an improved bumper mounting structure in which the width of a vertical parting line between a bumper and an adjacent fender is made adjustable so that the dimensional errors in the bumper and the fender can be accommodated.

These and other objects of the present invention can be accomplished by providing a bumper mounting structure in which a vertical parting line is defined between a bumper and a part of a vehicle body such as a fender, comprising: a first member attached to the bumper; a second member attached to the fender; adjusting means for adjusting the mutual distance between the first member and the second member along a direction perpendicular to the vertical parting line. According to a preferred embodiment of the present invention, the adjusting means comprises screw means threaded to one of the two members and extends along the fore-and-aft direction of the vehicle body, and a surface provided in the other member for abutting the free end of the screw means thereto. Thus, the adjusting means is not required to be visible from the front or side of the vehicle, as it may be located in the edge of the wheel house opening in the form of screw heads.

According to a certain aspect of the present invention, one of the two members is provided with a groove for receiving a part of the other member for accomplishing a sliding engagement between the two members so as to permit a relative motion along the fore-and-aft direction of the vehicle body. Further, means is provided in the two members which opposes a relative motion therebetween along any direction perpendicular to the fore-and-aft direction of the vehicle body. Thus, in spite of the provision of the adjusting means, the overall rigidity and the mechanical strength of the bumper mounting structure are assured. Thereby, a favorable unified appearance is obtained without in any way impairing the performance of the bumper as means for absorbing the shock of a minor collision.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
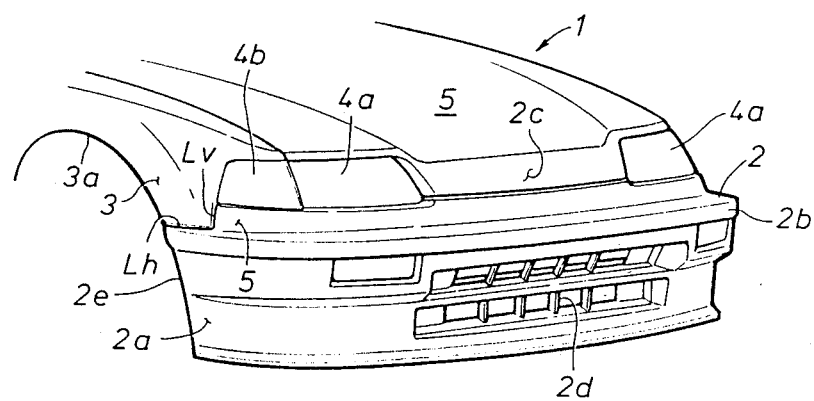
FIG. 1 is a perspective view of a vehicle body to which the present invention is applied.
Figure 2:
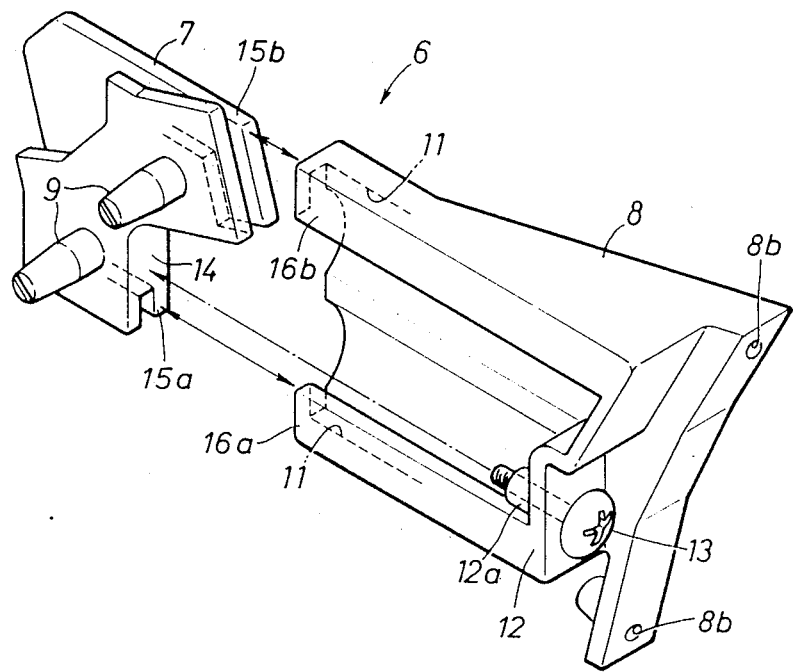
FIG. 2 is an exploded perspective view of the structure for mounting a side portion of a bumper to a lower part of a fender according to the present invention.
Figure 3:
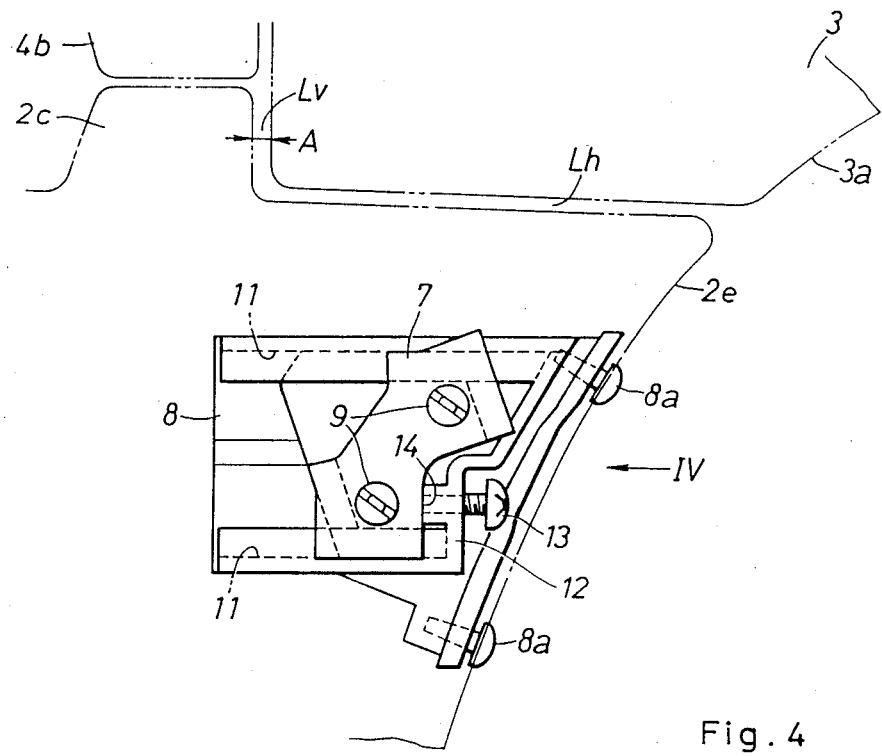
FIG. 3 is a view of the bumper mounting structure according to the present invention as seen from the interior of the wheel house.

FIG. 1 shows a front part of a vehicle body 1 having a bumper 2 extending across the whole width of the front part of the vehicle body 1. This bumper 2 consists of a skirt portion 2a which extends across the lower part of the bumper 2 and is provided with a grill 2d for admitting air into the engine room, a horizontal middle portion 2b which protrudes outwardly more than any other parts of the bumper 2 and likewise extends the whole length of the bumper 2, and an upper waist portion 2c which is painted in the same color as the fenders 3, the engine hood 5 and other parts of the vehicle body 1, and does not quite extend the whole length of the bumper 2. Each of the fenders 3 defines a wheel house opening 3a, and the side edge 2e of the bumper 2 defines an extension of the wheel house opening 3a.

The part of the vehicle body 1 immediately above the waist portion 2c of the bumper 2 is provided with headlight units 4a and flasher lamp units 4b.

Thus, the waist portion 2c of the bumper 2 is provided with a unified appearance in relation with the hood 5 and the fenders 3. In this case, the waist portion 2c of the bumper 2 adjoins the front lower edge of the hood 5 and the lower boundaries of the headlight units 4a and the flasher lamp units 4b. Each of the extreme side ends of the waist portion 2c aligns with the outer side boundary of the corresponding flasher lamp unit 4b while the front lower end of each of the fenders 3 adjoins both the side end of the waist portion 2c and the upper end of the middle portion 2b by a vertically extending parting line Lv and horizontal parting line Lh, respectively.

Figure 4:
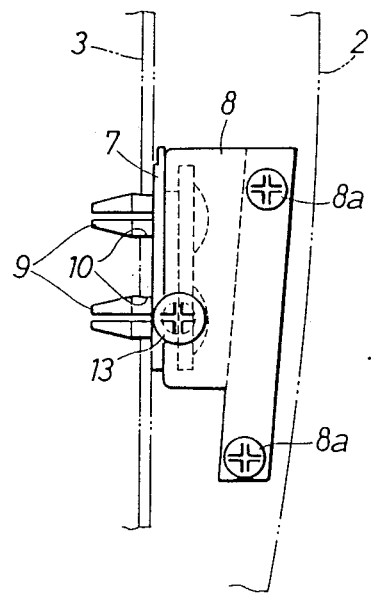
FIG. 4 is a view as seen from the direction indicated by the arrow IV in FIG. 3.

The fender 3 and the side end of the bumper 2 are connected to each other by way of a mounting assembly 6 which comprises a first member 7 which is fixedly secured to the fender 3 and a second member 8 which is fixedly secured to the bumper 2. The first member 7 is secured to the fender 3 by means of a pair of clips 9 which inwardly project from the first member 7 and are fitted into corresponding holes 10 provided in the fender 3 (FIG. 4). The second member 8 is secured to the bumper 2 by means of self tapping screws 8a which are passed through holes provided in the side edge of the bumper 2 and threaded into the holes 8b provided in the second member 8.

The second member 8 is provided with a generally C-shaped cross section, and defines a pair of grooves 11 in its internal upper and lower surfaces. The first member 7 is provided with a pair of shoes 15a and 15b at its upper and lower ends which are slidably fitted into the grooves 11. The grooves 11 are partly defined by flanges 16a and 16b which limits the relative motion between the first and the second members 7 and 8 only to that along the longitudinal direction of the grooves 11. The second member 8 is provided with a substantially vertical wall 12 which extends between the upper and lower grooves 11 at their extreme ends adjacent to the side end of the bumper 2. This vertical wall 12 is provided with an inwardly directed boss 12a through which a self tapping screw 13 are threaded inwardly along the fore-and-aft direction of the vehicle.

Thus, when the first member 7 which is joined to the fender 3 is inserted into the second member 8 joined to the bumper 2 as a process of mounting the bumper 2 to the vehicle body 1, since some allowance is provided to the dimensions of the bumper 2 and the vehicle body 1 so that the width A of the parting line Lv be larger than the optimum value, and the vertical rear end surface 14 of the first member 7 abut the free end of the tapping screw 13. Therefore, as the screw 13 is threaded into the boss 12a and pushes the first member 7 away from the second member 8, the width A of the gap in the vertically extending parting line Lv diminishes. Thus, according to the present invention, since the width A of the vertically extending parting line Lv between the fender 3 and the bumper 2 can be finely adjusted by means of the screw 13, a highly attractive appearance of the unified bumper-fender structure can be obtained.

In assembling the bumper 2 to the vehicle body 1, it is possible either to slide fit the two members 7 and 8 together after the two members 7 and 8 are attached to the fender 3 and the bumper 2, respectively, or to fit the clips 9 of the first member 7 into the holes 10 of the fender 3 after securing the second member 8 and slide fitting the two members 7 and 8 together.

What we claim is:

1. A bumper mounting structure in which a vertically extending parting line is defined between a bumper and a part of a vehicle body including a fender, comprising:
   a first member supported by to said bumper;
   a second member supported by to said fender;
   adjusting means in connection with said first and second members for adjusting the mutual distance between said first member and said second member along a direction perpendicular to said vertically extending parting line after installing of the bumper, said perpendicular direction being parallel to the fore-and-aft direction of said vehicle body.

2. A bumper mounting structure in which a vertically extending parting line is defined between a bumper and a part of the vehicle body including a fender, comprising:
   a first member attached to said bumper;
   a second member attached to said fender;
   adjusting means for adjusting the mutual distance between said first member and said second member along a direction perpendicular to said vertical parting line, said adjusting means comprising screw means threaded to one of said two members and extending along fore-and-aft direction of said vehicle body, and a surface provided in the other member for abutting the free end of said screw means thereto.

3. A bumper mounting structure as defined in claim 2, wherein one of said two members is provided with a groove for receiving a part of the other member for accomplishing a sliding engagement between said two members so as to permit a relative motion along the fore-and-aft direction of said vehicle body.

4. A bumper mounting structure as defined in claim 3, wherein means is provided in said two members which opposes a relative motion therebetween along any direction perpendicular to said fore-and-aft direction of said vehicle body.

5. A bumper mounting structure in which a vertically extending parting line is defined between a bumper and a part of a vehicle body including a fender, comprising;
   a first member attached to said bumper;
   a second member attached to said fender;
   a groove provided on one of said two members for receiving a part of the member for accomplishing a sliding engagement between said two members so as to permit a relative motion along the fore-and-aft direction of said vehicle body; adjusting means for adjusting the mutual distance between said first member and said second member along a direction perpendicular to said vertically extending parting line after installing of the bumper.

6. A bumper mounting structure as defined in claim 5 wherein means is provided in said two members which opposes a relative motion there between along any direction perpendicular to said fore-and-aft direction of said vehicle body.

* * * * *